(12) United States Patent
Waugh

(10) Patent No.: US 10,445,306 B1
(45) Date of Patent: Oct. 15, 2019

(54) DATABASE INDEX STORAGE BASED ON TEMPORAL DATA

(71) Applicant: Amazon Technologies, Inc., Seattle, WA (US)

(72) Inventor: Robert Mark Waugh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 798 days.

(21) Appl. No.: 14/861,991

(22) Filed: Sep. 22, 2015

(51) Int. Cl.
*G06F 16/00* (2019.01)
*G06F 16/23* (2019.01)
*G06F 16/22* (2019.01)
*G06F 16/2455* (2019.01)

(52) U.S. Cl.
CPC .......... *G06F 16/23* (2019.01); *G06F 16/2228* (2019.01); *G06F 16/2455* (2019.01)

(58) Field of Classification Search
CPC .................................................. G06F 17/3005
See application file for complete search history.

(56) References Cited

U.S. PATENT DOCUMENTS

| | | | |
|---|---|---|---|
| 6,345,268 B1 * | 2/2002 | de la Huerga | G06F 17/22 705/2 |
| 7,756,868 B2 * | 7/2010 | Lee | G06F 17/30864 707/725 |
| 8,082,237 B2 * | 12/2011 | Hughes | G06F 17/30551 707/694 |
| 2003/0023412 A1 * | 1/2003 | Rappaport | G06Q 10/10 703/1 |
| 2006/0085456 A1 * | 4/2006 | Pickering | G06F 17/30309 |
| 2006/0184563 A1 * | 8/2006 | Potter | G06F 17/30548 |
| 2013/0018849 A1 * | 1/2013 | Johnston | G06F 17/30309 707/687 |
| 2013/0339371 A1 * | 12/2013 | Hayashi | G06F 17/3087 707/743 |
| 2015/0081719 A1 * | 3/2015 | Ray | G06F 17/30241 707/743 |

* cited by examiner

*Primary Examiner* — Cheryl Lewis
(74) *Attorney, Agent, or Firm* — Davis Wright Tremaine LLP

(57) ABSTRACT

An analytics service receives a request to store a first temporal data record specifying a time interval during which data for a computing resource was collected within a database. The analytics service uses the time interval for the first temporal data record to obtain a second temporal data record from the database specifying an end time that is greater than the start time of the time interval of the first temporal data record. The analytics service generates new temporal data records that correspond to non-overlapping time intervals as a result of a determination that there is an overlap between the time intervals of the first temporal data record and the second temporal data record.

20 Claims, 8 Drawing Sheets

US 10,445,306 B1

DATABASE INDEX STORAGE BASED ON TEMPORAL DATA

BACKGROUND

Customers, administrators, and other users often utilize data logs to analyze their resources and identify any trends or anomalies that may need to be addressed. For instance, these customers, administrators, and other users may access an analytics service and submit a request to obtain any temporal records having an end time that is greater than a specified start time. However, due to the nature of the storage of these temporal records over time, there may be overlapping temporal regions of data resulting from the back-filling of data, out of sync computer clocks, and the like. As a result of these overlaps, analytics services often provide a significant number of temporal records even if the overlap is minimal. This can prove to be inefficient and potentially very expensive as a result of the analysis needed for each temporal record to identify which data logs have the data they seek.

BRIEF DESCRIPTION OF THE DRAWINGS

Various techniques will be described with reference to the drawings, in which.

DETAILED DESCRIPTION

Figure 1:
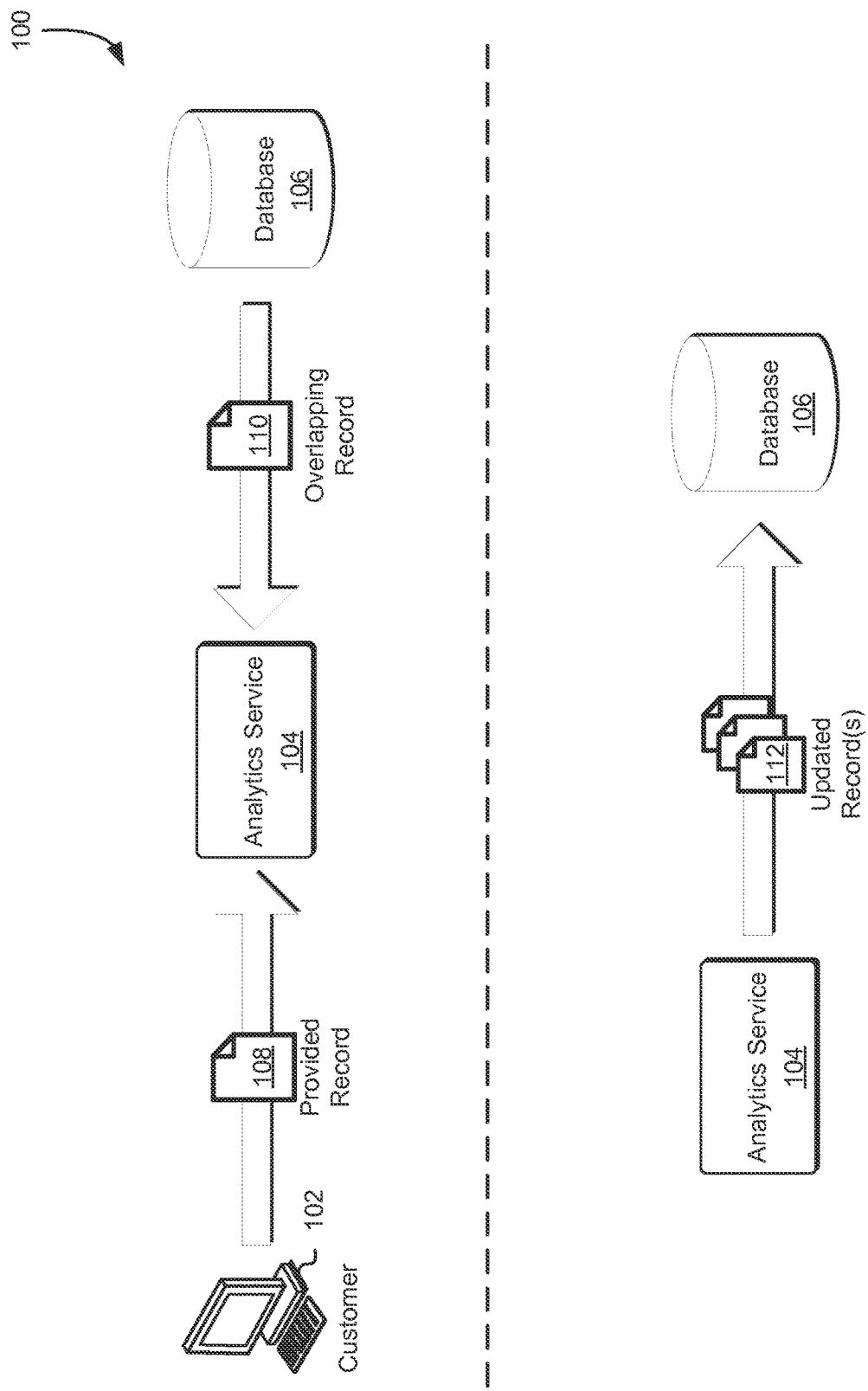
FIG. 1 shows an illustrative example of an environment in which temporal records are encoded into a database based at least in part on the temporal region of a provided record and the temporal region of an overlapping record from the database in accordance with at least one embodiment.

This disclosure relates to the analysis and updating of received and existing temporal records based on overlapping time intervals such that a set of temporal records can be encoded without any overlapping time intervals. In one example, an analytics service receives a temporal data record from a customer of a computing resource service provider or from a service provided by the computing resource service provider. The temporal data record may define a bi-temporal data region that includes a start time for the data collected and an end time in which data collection was finished. When the analytics service receives the temporal data record from the customer or a service provided by the computing resource service provider, the analytics service may determine the start time specified within the temporal data record and submit a query to a database to identify any temporal data records having an end time later than the start time specified within the received record.

In one example, the analytics service obtains, from the database, any temporal data records having a specified end time later than the start time of the temporal data record obtained from the customer or other service. The analytics service may evaluate these temporal data records from the database and determine whether there is any overlap between the temporal data record obtained from the customer or other service and any of the temporal data records from the database. The analytics service may select a first temporal data record that has an overlapping temporal data region with the received temporal data record and identify the time range of the identified overlapping temporal data region. Based at least in part on the time range of the overlapping temporal data region, the analytics service may create a new temporal data record ranging from the start time of the temporal data record from the customer or other service to the start time of the overlapping data region. In some examples, if the overlapping temporal data region has a start time equal to the start time of the temporal data record from the customer or other service, the analytics service will not create this temporal data record.

The analytics service may further create a new temporal data record that includes links for the data for the overlapping temporal data region. This new temporal data record may specify a link to the data corresponding to the temporal data record from the customer or other service and a link to the data corresponding to the temporal data record obtained from the database. The new temporal data record may correspond to the time range of the identified overlapping temporal data region. If there is an additional temporal data region beyond the end time of the overlapping temporal data region, the analytics service may create an additional temporal data record that includes a link to the data corresponding to this remaining data region.

In an example, the analytics service stores the newly created temporal data records into the database and deletes the temporal data record from the database that was used to generate the new temporal data records. The analytics service may select another temporal data record that was identifies as having an overlapping temporal data region with the received temporal data record from the customer or other service and determine whether there is still an overlap between the selected temporal data record and the newly created temporal data records. If so, the analytics service may repeat the process described above to create new temporal data records having distinct temporal data regions.

In this manner, the analytics service may separate the temporal data regions of any existing temporal data records and temporal data records obtained from a customer or other services into distinct, non-overlapping temporal data records that are then encoded into the database. In addition, the techniques described and suggested in this disclosure further allow for additional technical advantages. For instance, because the analytics service is configured to divide the temporal data records into temporal data records that do not have any overlapping temporal data regions, requests to obtain temporal data records having an end time that is greater than a specified start time may be fulfilled by providing non-overlapping temporal data records. This may result in improved efficiency, as the analytics service may only be required to perform one read operation to obtain the requested temporal data records.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which temporal records are encoded into a database 106 based at least in part on the temporal data region of a provided record 108 and the temporal region of an overlapping record 110 from the database 106 in accordance with at least one embodiment. In the environment 100, a customer 102 of an analytics service 104 may submit a request to the analytics service to provide a temporal data record 108 to the analytics service 104. The customer 102 may be a user of a computing resource service provider that utilizes one or more services such as a virtual computer system service, object-based data storage services, database services, a policy management service and configuration and management services as well as a plurality of other services to create and manage resources and to support operational needs. In some embodiments, the customer 102 can be any other service or computing resource provided by the computing resource service provider. As will be described in greater detail below, these computing resources may each include a reporting agent, which may be configured to log a user's usage of the computing resource and record any data associated with the computing resource over time. The reporting agent may transmit this data to the analytics service 104 along with the temporal data record 108 that may be used to identify the data in the database 106.

The temporal data record 108 may include bi-temporal information that may be used to determine the temporal data region (e.g., time interval) for the record 108. For instance, the temporal data record 108 may specify a start time at which the data associated with the temporal data record 108 started being collected by the customer 102. The temporal data record 108 may further specify an end time at which the customer 102 stopped collecting data associated with the temporal data record 108. The temporal data record 108 may include additional metadata that may be used to identify where the data associated with the record 108 is stored. For example, the temporal data record 108 may include a link (e.g., a HyperText Markup Language (HTML) link, etc.) to where the data associated with the temporal data record 108 is stored. The analytics service 104 may utilize this link to locate the data associated with the temporal data record 108 in response to data queries. In addition to the link, the temporal data record 108 may specify the associated metric and the computing resource for which the data was recorded.

In response to receiving a new temporal data record 108 from the customer 102, the analytics service 104 may evaluate the temporal data record 108 to identify the start time at which the data associated with the temporal data record 108 was being recorded by the customer 102. The analytics service 104 may utilize the specified start time in the temporal data record 108 to generate a database query configured such that a second temporal data record having an end time greater than the start time is responsive to the database query. The analytics service 104 may be a computer system (e.g., a distributed computer system) comprising one or more analytics servers configured (e.g., with hardware and/or software) to process any database queries by accessing the database 106 and evaluating a database index to identify any temporal data records that may be obtained to fulfill the query. Thus, in response to the query, the analytics servers of the analytics service 104 may obtain a temporal data record from the database 106 that has a specified end time that is greater than the start time specified in the provided temporal data record 108.

In an embodiment, the temporal data record 110 obtained from the database 106 has a temporal data region that overlaps the temporal data region of the temporal data record 108 provided by the customer 102. For instance, the overlapping temporal data record 110 may specify an end time that is less than the end time of the provided temporal data record 108 and may specify a start time that is greater than the start time of the provided temporal data record 108. If such an overlap is present, the analytics service 104 may generate a new temporal data record that corresponds to a temporal data region defined as having the start time of the provided temporal data record 108 and an end time corresponding to the start time of the overlapping temporal data record 110 obtained from the database 106. Since this newly defined temporal data region corresponds to data associated with the provided temporal data record 108, the analytics service 104 may generate the new temporal data record for this temporal data region to include only metadata associated with the provided temporal data record 108, including a link to the data associated with the provided temporal data record 108.

The analytics service 104 may further generate a second new temporal data record that corresponds to a temporal data region having a start time corresponding to the start time of the overlapping temporal data record 110 and an end time corresponding to the end time of the overlapping temporal data record 110. The analytics service 104 may generate this new temporal data record for the overlapping temporal data region to include metadata associated with both the provided temporal data record 108 and the overlapping temporal data record 110, as data associated with both records 108, 110 may be stored within the database 106. Thus, the new temporal data record may further include both links from the provided temporal data record 108 and the overlapping temporal data record 110. In some embodiments, since the overlapping temporal data region is the same as the temporal data region defined in the overlapping temporal data record 110, the analytics service 104 can append the overlapping temporal data record 110 to include the metadata of the provided temporal data record 108 instead of creating a new temporal data record to cover this overlapping temporal data region.

The analytics service 104 may additionally generate a third new temporal data record that corresponds to a temporal data region having a start time corresponding to the end time of the overlapping temporal data record 110. Further, the temporal data region for this new temporal data record may also have an end time corresponding to the end time of the provided temporal data record 108. Since the data corresponding to this new temporal data region is associated with only the provided temporal data record 108, the analytics service 104 may generate the new temporal data record in a manner that the new temporal data record only includes metadata of the provided temporal data record 108, since there is no data associated with the overlapping temporal data record 110 within this new temporal data region.

In response to the creation of these updated temporal data records 112, the analytics service 104 may transmit a request to the analytics servers to store these updated temporal data records 112 in the database 106. The analytics servers may access the database 106 and store these updated temporal data records 112 within the database 106. Further, the analytics servers of the analytics service 104 may delete the overlapping temporal data record 110 from the database 106 if new temporal data records were created based at least in part on the overlapping temporal data region defined between the provided temporal data record 108 and the overlapping temporal data record 110. For instance, if there is a complete temporal data region overlap (e.g., the temporal data region of the provided temporal data record 108 is within the temporal data region of the overlapping temporal data record 110), the analytics service 104 may append the overlapping temporal data record 110 to include the metadata of the provided temporal data record 108. Under these circumstances, the analytics servers may delete the provided temporal data record 108 and update the database 106 to have the latest version of the overlapping temporal data record 110.

However, if the there is a partial temporal data region overlap between the provided temporal data record 108 and the overlapping temporal data record 110, the analytics servers may delete the overlapping temporal data record 110 from the database 106 as the updated temporal data records 112 are added to the database 106. For instance, since the temporal data region of the overlapping temporal data record 110 may be divided into smaller temporal data regions if the overlapping temporal data record 110 has a temporal data region that extends beyond the temporal data region of the provided temporal data record 108, the analytics service 104 may generate updated temporal data records 112 that correspond to these smaller temporal data regions whereby an updated temporal data record may correspond to the data from both the provided temporal data record 108 and the overlapping temporal data record 110 and another updated temporal data record may correspond to just the data from the overlapping temporal data record 110. Thus, the analytics servers may delete the overlapping temporal data record 110 from the database 106 when updated temporal data records 112 are created and the original temporal data region of the overlapping temporal data record 110 is divided into a temporal data region corresponding to a data overlap and a temporal data region corresponding to data from just the overlapping temporal data record 110.

The analytics servers of the analytics service 104 may update an index of the database 106 to indicate the presence of the new updated temporal data records 112 within the database 106 and to specify the start time and end time of the temporal data region of each of these updated temporal data records 112. Thus, when a customer 102 submits a query to the analytics service 104 for data within a temporal data region starting with a specified start time, the analytics service 104 may query the database 106 to identify the temporal data record having an end time that is greater than the specified start time, access the temporal data record, and determine where the associated data is located within the database 106. The analytics service 104 may then obtain the requested data and provide it to the customer 102 to fulfill the customer's request.

As noted above, an analytics service may generate one or more updated temporal data records in response to a request from a customer to incorporate a new temporal data record into the analytics service database. For instance, if the temporal data region of the provided temporal data record consumers a temporal data region of an identified, overlapping temporal data record, the analytics service may generate one or more updated temporal data records that correspond to smaller temporal data regions corresponding to the data of the provided temporal data record and that correspond to the overlapping temporal data region corresponding to the data of both the provided temporal data record and the overlapping temporal data record. Accordingly, FIG. 2 shows an illustrative example of an environment 200 in which temporal records 208, 210, 212 are encoded into a database based at least in part on overlapping temporal regions in accordance with at least one embodiment.

In the environment 200, an analytics service 202 may receive, from a customer of the analytics service 202, a temporal data record 204 that is to be stored within a database of the analytics service 202. The analytics service 202 may evaluate the provided temporal data record 204 to identify a temporal data region corresponding to data associated with the provided temporal data record 204. For instance, in this illustrative example, the analytics service 202 may determine, based at least in part on metadata of the provided temporal data record 204, that the temporal data region of the provided temporal data record 204 has a start time at t=0 seconds and an end time at t=11 seconds. The analytics service 202 may generate a database query based at least in part on the start time of the temporal data region to identify any temporal data records that have an end time that is greater than the specified start time of the provided temporal data record 204 (e.g., t=0 seconds, as illustrated in FIG. 2).

Figure 2:
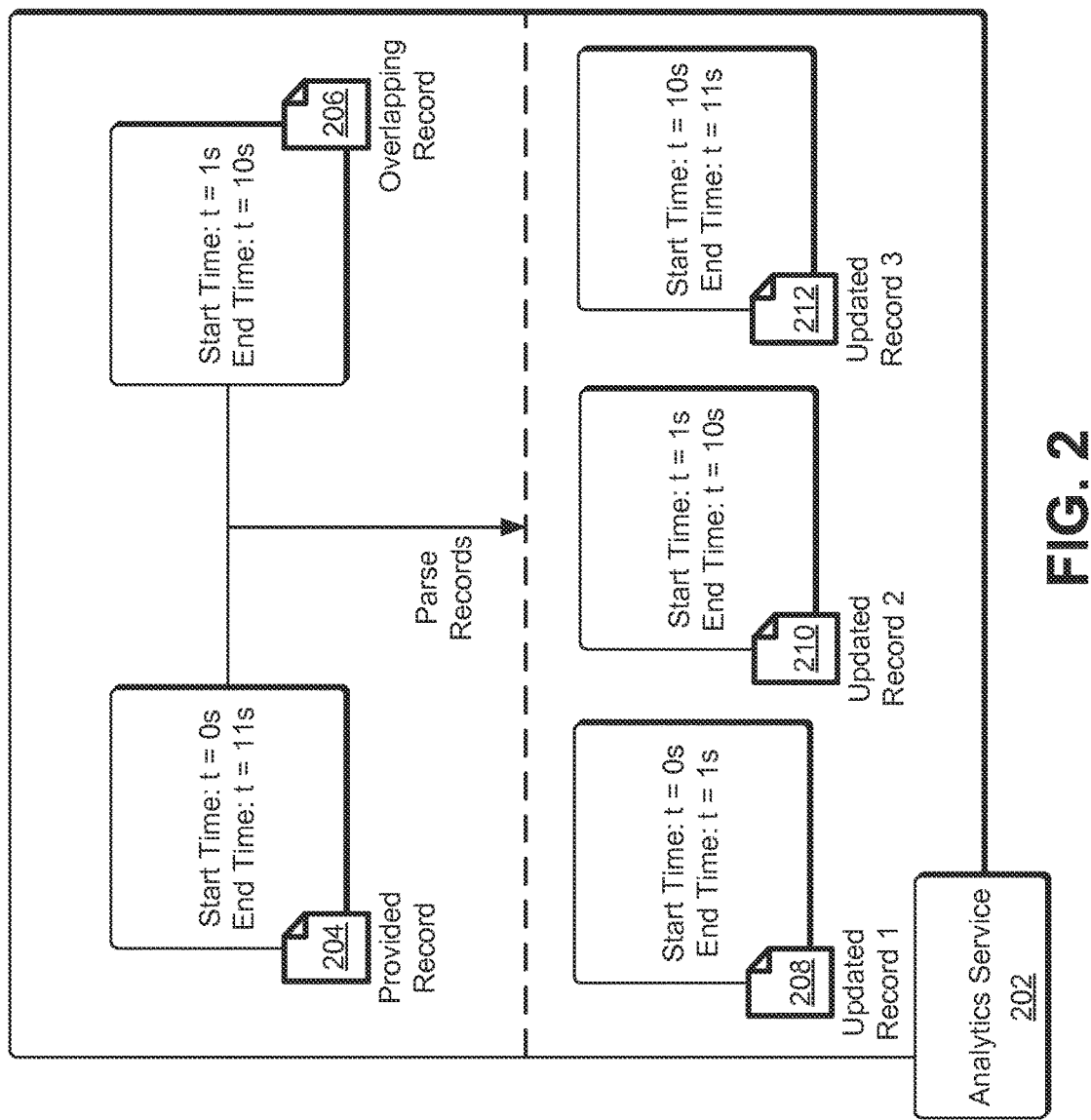
FIG. 2 shows an illustrative example of an environment in which temporal records are encoded into a database based at least in part on overlapping temporal regions in accordance with at least one embodiment.

As illustrated in FIG. 2, the analytics service 202 has identified an overlapping temporal data record 206 that has an end time of t=10 seconds, which is greater than the start time of the provided temporal data record 204. The overlapping temporal data record 206 may have a temporal data region that has a start time of t=1 second and the aforementioned end time of t=10 seconds. This particular temporal data region of the overlapping temporal data record 206 is within the bounds of the temporal data region of the provided temporal data record 204 such that data associated with the overlapping temporal data record 206 may not cover the temporal data region from t=0 seconds to t=1 second and from t=10 seconds to t=11 seconds. Based at least in part on this determination, the analytics service 202 may define, as illustrated in FIG. 2, three distinct temporal data regions. For instance, the analytics service 202 may define a temporal data region from t=0 seconds to t=1 second, a temporal data region from t=1 second to t=10 seconds, and a temporal data region from t=10 seconds to t=11 seconds.

The analytics service 202 may utilize these newly defined temporal data regions to generate one or more updated temporal data records. For instance, the analytics service 202 may generate an updated temporal data record 208 that corresponds to the temporal data region from t=0 seconds to t=1 second. Since the overlapping temporal data record 206 is not associated with any data within this temporal data region, this updated temporal data record 208 may only correspond to the data associated with the provided temporal data record 204. Thus, the analytics service 202 may include metadata associated with the provided temporal data record 204 in the updated temporal data record 208 to enable the analytics service 202 to locate the data associated with the provided temporal data record 204 in response to a query for data having an end time greater than t=0 seconds.

The analytics service 202 may further generate a second updated temporal data record 210 that corresponds to the overlapping temporal data region between t=1 second and t=10 seconds. In this illustrative example, since this overlapping temporal data region would correspond to data associated with the provided temporal data record 204 and data associated with the overlapping temporal data record 206, the analytics service 202 may generate the updated temporal data record 210 such that it specifies metadata of both the provided temporal data record 204 and the overlapping temporal data record 206. Further, the analytics service 202 may delete the overlapping temporal data record 206 once the updated temporal data record 210 has been added to the database and the database index has been updated to associate the temporal data region of this record 210 (e.g., t=1 second to t=10 seconds) with the record 210.

In some embodiments, the analytics service 202 will append the overlapping temporal data record 206 to specify metadata of the provided temporal data record 204 if the temporal data region of the overlapping temporal data record 206 is completely within the temporal data region of the provided temporal data record 204. For instance, instead of generating a new updated temporal data record 210 that corresponds to the overlapping temporal data region, the analytics service 202 may append the overlapping temporal data record 206 with the metadata of the provided temporal data record 204 such that the overlapping temporal data record 206 includes links to the data associated with the provided temporal data record 204 and the data associated with the overlapping temporal data record 206. If the analytics service 202 appends the overlapping temporal data record 206 in this fashion, the analytics service 202 may not delete the overlapping temporal data record 206 or generate the new updated temporal data record 210 for this temporal data region.

In addition to the updated temporal data records 208, 210 corresponding, respectively, to the temporal data region from t=0 seconds to t=1 second and the temporal data region from t=1 second to t=10 seconds, the analytics service 202 may generate a third temporal data record 212 that corresponds to the remaining temporal data region from t=10 seconds to t=11 seconds. This third updated temporal data record 212 may be similar to the first updated temporal data record in that the overlapping temporal data record 206 is not associated with any data within this temporal data region. The analytics service 202 may thus similarly include metadata associated with the provided temporal data record 204 in the updated temporal data record 212 to enable the analytics service 202 to locate the data associated with the provided temporal data record 204 in response to a query for data having an end time greater than t=10 seconds.

The analytics service 202 may update a database to incorporate the updated temporal data records 208, 210, 212 and remove any redundant temporal data records, such as the provided temporal data record 204 and the overlapping temporal data record 206. Further, the analytics service 202 may update a database index to indicate which temporal data records are associated with particular temporal data regions. Thus, when the analytics service 202 receives a query to obtain data having an end time greater than a particular start time, the analytics service 202 may refer to the database index to identify a temporal database record having an end time greater than the time specified in the query. Since there are no overlapping temporal data records, the analytics service 202 may identify a single temporal data record and provide the data associated with this temporal data record to fulfill the request.

As noted above, an analytics service may identify an overlapping temporal data record that has a temporal data region that overlaps a temporal data region of a temporal data record provided by a customer of the analytics service. The overlapping temporal data region may have a common start time, a common end time, or both. Based at least in part on this overlapping temporal data region, the analytics service may determine whether updated temporal data records need to be created such that there are no overlapping records in the database. Accordingly, FIG. 3 shows an illustrative example of an environment 300 in which temporal records 308, 310 are encoded into a database based at least in part on overlapping temporal regions in accordance with at least one embodiment.

Similar to the environment 200 described above, in the environment 300, an analytics service 302 may receive, from a customer of the analytics service 302, a temporal data record 304 that is to be stored within a database of the analytics service 302. The analytics service 302 may evaluate the provided temporal data record 304 to identify a temporal data region corresponding to data associated with the provided temporal data record 304. For instance, in this illustrative example, the provided temporal data record 304 may have a similar temporal data region as the provided temporal data record 204 described above (e.g., a start time at t=0 seconds and an end time at t=11 seconds). The analytics service 302 may generate a database query based at least in part on the start time of the temporal data region to identify any temporal data records that have an end time that is greater than the specified start time of the provided temporal data record 304.

Figure 3:
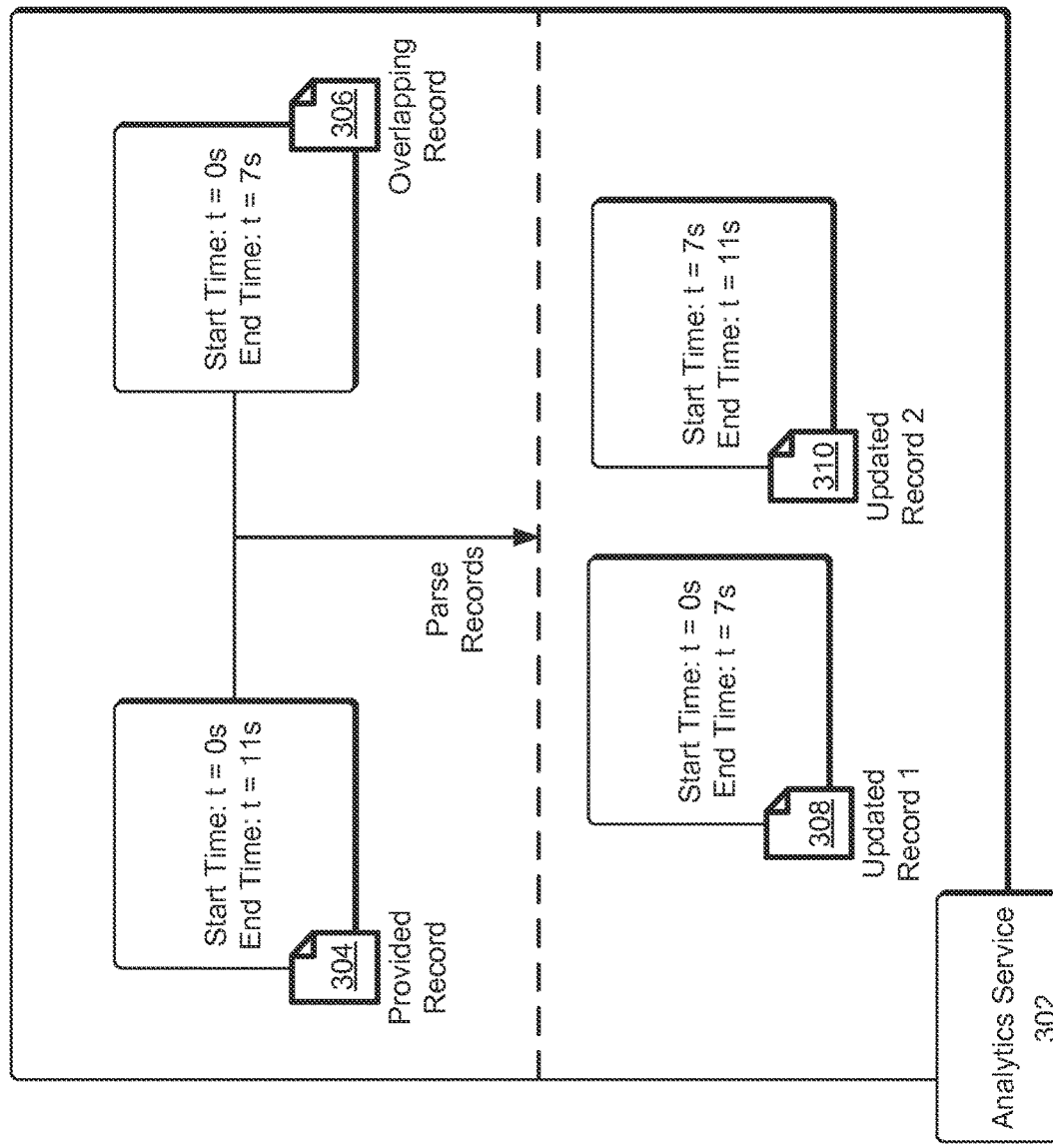
FIG. 3 shows an illustrative example of an environment in which temporal records are encoded into a database based at least in part on overlapping temporal regions in accordance with at least one embodiment.

As illustrated in FIG. 3, the analytics service 302 has identified an overlapping temporal data record 306 that has an end time of t=7 seconds, which is greater than the start time of the provided temporal data record 304. The overlapping temporal data record 306 may have a temporal data region that has a start time of t=1 second and the aforementioned end time of t=7 seconds. This particular temporal data region of the overlapping temporal data record 306 thus has a start time that equivalent to the start time of the temporal data region of the provided temporal data record 304 such that data associated with the overlapping temporal data record 306 may not cover the temporal data region from t=7 seconds to t=11 seconds. Based at least in part on this determination, the analytics service 302 may define, as illustrated in FIG. 3, two distinct temporal data regions. For instance, the analytics service 302 may define a temporal data region from t=0 seconds to t=7 seconds and a temporal data region from t=7 seconds to t=11 seconds.

Based at least in part on the identified temporal data regions, the analytics service 302 may generate an updated temporal data record 308 that corresponds to the overlapping temporal data region between t=0 seconds and t=7 seconds. In this illustrative example, since this overlapping temporal data region would correspond to data associated with the provided temporal data record 304 and data associated with the overlapping temporal data record 306, the analytics service 302 may generate the updated temporal data record 308 such that it specifies metadata of both the provided temporal data record 304 and the overlapping temporal data record 306. Further, the analytics service 302 may delete the overlapping temporal data record 306 once the updated temporal data record 308 has been added to the database and the database index has been updated to associate the temporal data region of this record 308 (e.g., t=0 seconds to t=7 seconds) with the record 308.

In some embodiments, the analytics service 302 can append the overlapping temporal data record 306 to include metadata included within the provided temporal data record 304 if the entire temporal data region of the overlapping temporal data record 306 is subsumed by the temporal data region of the provided temporal data record 304. For instance, instead of generating a new updated temporal data record 308 that corresponds to the overlapping temporal data region, the analytics service 302 may append the overlapping temporal data record 306 with the metadata of the provided temporal data record 304 such that the overlapping temporal data record 306 includes links to the data associated with the provided temporal data record 304 and the data associated with the overlapping temporal data record 306.

In addition to the updated temporal data record 308 corresponding to the temporal data region from t=0 seconds to t=7 seconds, the analytics service 302 may generate a second temporal data record 310 that corresponds to the remaining temporal data region from t=7 seconds to t=11 seconds. This second updated temporal data record 310 may incorporate the metadata of the provided temporal data record 304 as the overlapping temporal data record 306 may not be associated with any data within this temporal data region. The analytics service 302 may thus include metadata associated with the provided temporal data record 304 in the updated temporal data record 310 to enable the analytics service 302 to locate the data associated with the provided temporal data record 304 in response to a query for data having an end time greater than t=7 seconds. The analytics service 302 may update a database to incorporate the updated temporal data records 308, 310 and remove any redundant temporal data records, such as the provided temporal data record 304 and the overlapping temporal data record 306. Further, the analytics service 302 may update a database index to indicate which temporal data records are associated with particular temporal data regions.

It should be noted that while various updated temporal data records are created for the purpose of illustration, if a temporal data region of a provided temporal data record or of an identified temporal data record overlaps the entire temporal data region of another temporal data record, the analytics service 302 may combine the metadata of these temporal data records into a single record. For instance, using the illustrative example of FIG. 3, the analytics service 302 may alternatively copy the metadata from the overlapping temporal data record 306 into the provided temporal data record 304 and store the updated version of the provided temporal data record 304. This may occur since the temporal data region of the provided data record 304 (e.g., t=0 seconds to t=11 seconds) overlaps the entire temporal data region of the overlapping temporal data record 306 (e.g., t=0 seconds to t=7 seconds). A customer of the analytics service 302 may determine which method is used to generate the updated temporal data records, such that distinct updated temporal data records may be generated if the customer would prefer to have distinct temporal data records, as illustrated in FIG. 3, or a single record as described above.

Figure 4:
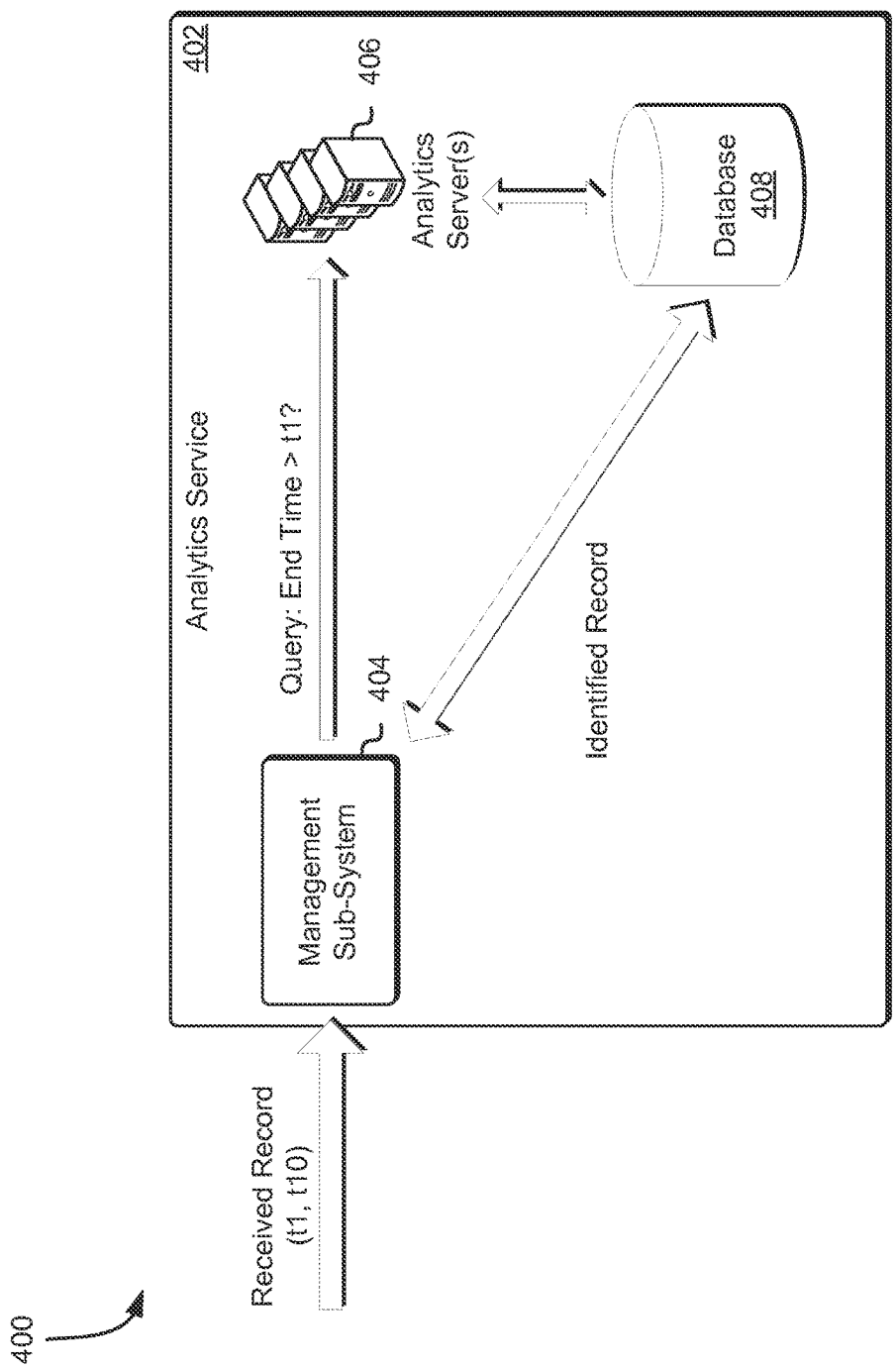
FIG. 4 shows an illustrative example of an environment in which one or more temporal records are obtained from a database to incorporate newly received temporal records and update a database index in accordance with at least one embodiment.

FIG. 4 shows an illustrative example of an environment 400 in which one or more temporal records are obtained from a database 408 to incorporate newly received temporal records and update a database index in accordance with at least one embodiment. In the environment 400, an analytics service 402 may receive, through a management sub-system 404, a request from a customer of the computing resource service provider or from a computing resource associated with the computing resource service provider to write a new temporal data record to a database 408. The new temporal data record may be provided as a result of new data being generated for a computing resource metric over a temporal data region as defined in the temporal data record. The management sub-system 404 may include one or more computer systems of the analytics service 402, one or more modules or processing engines of a computer system of the analytics service 402, or an application of the analytics service 402 that may be configured to process requests from customers of the computing resource service provider. The management sub-system 404 may also be configured to process application programming interface (API) calls from customers or other computing resources to perform one or more operations.

The management sub-system 404 may process the write request by evaluating the received temporal data record to determine the corresponding temporal data region of the data associated with the record. For instance, as illustrated in FIG. 4, the management sub-system 404 may determine that the received temporal data record defines a temporal data region with a start time of t=1 second and an end time of t=10 seconds. The management sub-system 404 may utilize the start time of the temporal data region to generate a database query configured such that a second temporal data record having an end time greater than the start time of the temporal data region is responsive to the database query. Thus, as illustrated in FIG. 4, the database query generated by the management sub-system 404 may specify that a temporal data record is to be identified that has an end time greater than t=1 second, which is the start time of the temporal data region of the received record.

The management sub-system 404 may transmit the generated database query to one or more analytics servers 406 that may be configured to interact with a database 408 comprising one or more temporal data records collected over time and the data associated with these one or more temporal data records. In some embodiments, the database 408 will only have the one or more temporal data records, as the one or more temporal data records may each include a link to a remote location where the associated data may be stored. In response to the query obtained from the management sub-system 404, the one or more analytics servers 406 may access the database 408 to identify a temporal data record that has a specified end time that is greater than the start time of the temporal data region of the received temporal data record. For instance, the analytics servers 406 may evaluate a database index to locate an identifier of the temporal data record that may be used to satisfy the query. The one or more analytics servers 406 may access the identified storage location of the temporal data record within the database 408 to retrieve the identified temporal data record and provide this temporal data record to the management sub-system 404.

The management sub-system 404 may evaluate the temporal data record from the database 408 to identify the temporal data region of the temporal data record and determine whether there is an overlap between this temporal data region and the temporal data region of the received temporal data record. If there is no overlap between the temporal data regions, the management sub-system 404 may transmit a request to the one or more analytics servers 406 to store the received temporal data record without any modifications into the database 408. The analytics servers 406 may store the received temporal data record in the database 408 and may further update the database index to indicate the relevant temporal data region of the received temporal data record for the processing of database queries for data.

If there is an overlap between the temporal data region of the received temporal data record and the temporal data region of the temporal data record obtained from the database 408, the management sub-system 404 may identify a number of distinct and non-overlapping temporal data regions. Based at least in part on these identified non-overlapping temporal data regions, the management sub-system 404 may generate one or more updated temporal data records that each corresponds to one of the distinct and non-overlapping temporal data regions identified by the management sub-system 404. The management sub-system 404 may include the metadata of the received temporal data record, the temporal data record from the database 408, or the metadata from both in an updated temporal data record based at least in part on the temporal data region of the updated temporal data record. For instance, if a temporal data region identified by the management sub-system 404 is associated only with data corresponding to the received temporal data record, the management sub-system 404 may populate the updated temporal data record associated with this temporal data region with the metadata of the received temporal data record.

The management sub-system 404 may transmit the updated temporal data records to the analytics servers 406, which may determine whether there are any redundant temporal data records in the database 408 and delete these redundant temporal data records form the database 408. Additionally, the one or more analytics servers 406 may store the updated temporal data records within the database 408 and update the database index to indicate the presence of these updated temporal data records. Thus, when a new query is obtained by the one or more analytics servers 406 for data corresponding to a temporal data region associated with one of these updated temporal data records, the one or more analytics servers 406 may identify the updated temporal data record from the database 408 and utilize the link within the record to obtain the data necessary to fulfill the query.

Figure 5:
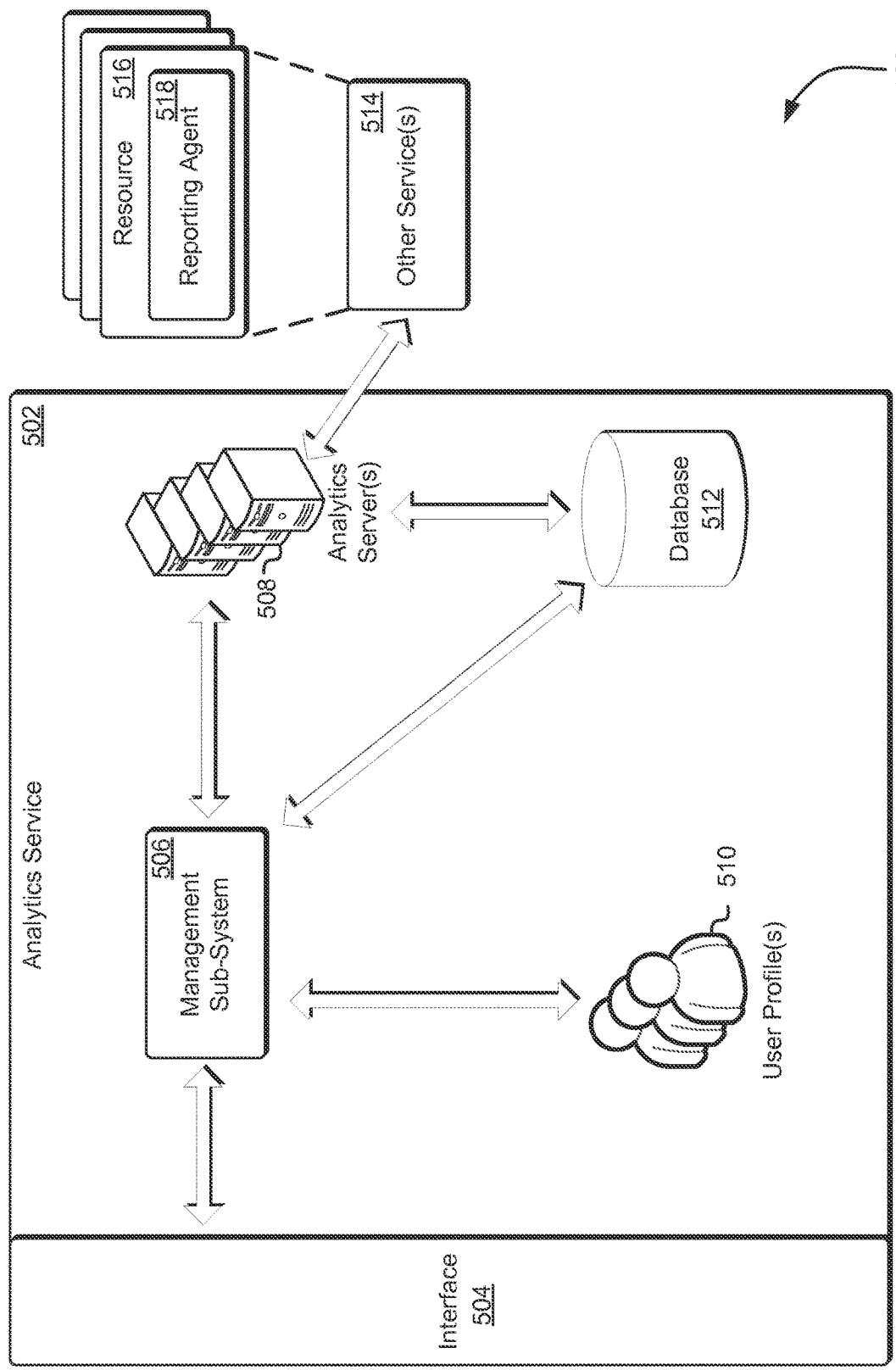
FIG. 5 shows an illustrative example of an environment in which various components of an analytics service are configured to obtain data from one or more services and consolidate temporal records provided by the one or more services or by customers through an interface in accordance with at least one embodiment.

FIG. 5 shows an illustrative example of an environment 500 in which various components of an analytics service 502 are configured to obtain data from one or more services 514 and consolidate temporal records provided by the one or more services 514 or by customers through an interface 504 in accordance with at least one embodiment. In the environment 500, the analytics service 502 may provide users with an interface 504, which the users may interact with in order to provide temporal data records that may correspond to data associated with the user's computing resources and to submit one or more queries for data associated with the user's computing resources. Through the interface 504, a user may request that one or more temporal data records for its computing resources be added to a database to enable data associated with these one or more temporal data records to be identified and located in response to read queries. For instance, when the user first accesses the interface 504, the interface 504 may obtain from the user a set of credentials that may be used to identify any computing resources allocated to the user. For example, the interface 504 may provide this set of credentials to a management sub-system 506, which is configured to access a user profile data store 510 and, based on a user profile corresponding to the set of credentials provided by the user, identify any computing resources allocated to the user. Based at least in part on this information obtained from the user profile data store 510, the management sub-system 506 may update the interface 504 to provide the user with identifiers for each of his/her computing resources for which the user may provide temporal data records. This may enable the user to utilize the interface 504 to provide its temporal data records for any of the identified computing resources.

The management sub-system 506 may evaluate the provided temporal data record from the interface 504 and identify a temporal data region associated with the provided temporal data record. For instance, the temporal data record may include metadata that may specify a start time for the corresponding data and an end time for when the collection of the corresponding data was terminated. The management sub-system 506 may utilize the start time for the corresponding data to generate the database query that may include a request for a temporal data record having an end time that is greater than the start time of the received temporal data record. This database query may be transmitted to the one or more analytics servers 508 of the analytics service 502, which may be configured to interact with a database 512 comprising one or more temporal data records collected over time and the data associated with these one or more temporal data records.

In response to the query obtained from the management sub-system 506, the one or more analytics servers 508 may access the database 512 to identify a temporal data record that has a specified end time that is greater than the start time of the temporal data region of the received temporal data record. The analytics servers 508 may evaluate the database index of the database 512 to locate an identifier of the temporal data record that may be used to satisfy the query. The one or more analytics servers 508 may access the identified storage location of the temporal data record within the database 512 to retrieve the identified temporal data record and provide this temporal data record to the management sub-system 506.

In some embodiments, the one or more analytics servers 508 will obtain temporal data records from one or more other services 514 of the computing resource service provider. For instance, the one or more analytics servers 508 may be configured to receive various data from the other services 514 provided by the computing resource service provider. Each of these other services 514 may include a number of computing resources 516, which may be utilized by the user for his/her business needs. These computing resources 516 may each include a reporting agent 518, which may be configured to log the user's usage of the computing resource 516 and record any data associated with the computing resource 516 over time. As the reporting agent 518 collects this data, the reporting agent 518 may transmit this data to the analytics server 508 which, in turn, may store this data within the database 512. The data stored within the database 512 may be categorized based at least in part on the computing resource 516 whence the data was obtained, the corresponding service 514 and any other identifiers (e.g., user identifier, data center location, etc.) that may be used to distinguish the data stored within the data repository 512.

In addition to the data obtained from these other services 514, the one or more analytics servers 508 may also receive a temporal data record from these other services 514 that is associated with the provided data. The one or more analytics servers 508 may provide this temporal data record to the management sub-system 506 which, in turn, may evaluate the temporal data record to identify its temporal data region and, based at least in part on this temporal data region, generate a database query for a temporal data record that has an end time greater than the start time of the temporal data region of the received temporal data record. The one or more analytics servers 508 may access the identified storage location of the temporal data record within the database 512 to retrieve the identified temporal data record and provide this temporal data record to the management sub-system 506.

As noted above, the management sub-system 506 may evaluate the temporal data record from the database 512 to identify the temporal data region of the temporal data record and determine whether there is an overlap between this temporal data region and the temporal data region of the received temporal data record. If there is no overlap between the temporal data regions, the management sub-system 506 may transmit a request to the one or more analytics servers 508 to store the received temporal data record without any modifications into the database 512. This may cause the one or more analytics servers 508 to store the received temporal data record in the database 512 and to update the database index.

If there is an overlap between the temporal data region of the received temporal data record and the temporal data region of the temporal data record obtained from the database 512, the management sub-system 506 may identify the distinct and non-overlapping temporal data regions. Based at least in part on these identified non-overlapping temporal data regions, the management sub-system 506 may generate one or more updated temporal data records that each corresponds to one of the distinct and non-overlapping temporal data regions identified by the management sub-system 506. The management sub-system 506 may include the metadata of the received temporal data record, the temporal data record from the database 512, or the metadata from both in an updated temporal data record based at least in part on the temporal data region of the updated temporal data record. The management sub-system 506 may transmit the updated temporal data records to the one or more analytics servers 508, which may delete any redundant temporal data records from the database 512 and store the updated temporal data records within the database 512. Additionally, the one or more analytics servers 508 may update the database index to indicate the presence of these updated temporal data records.

Figure 6:
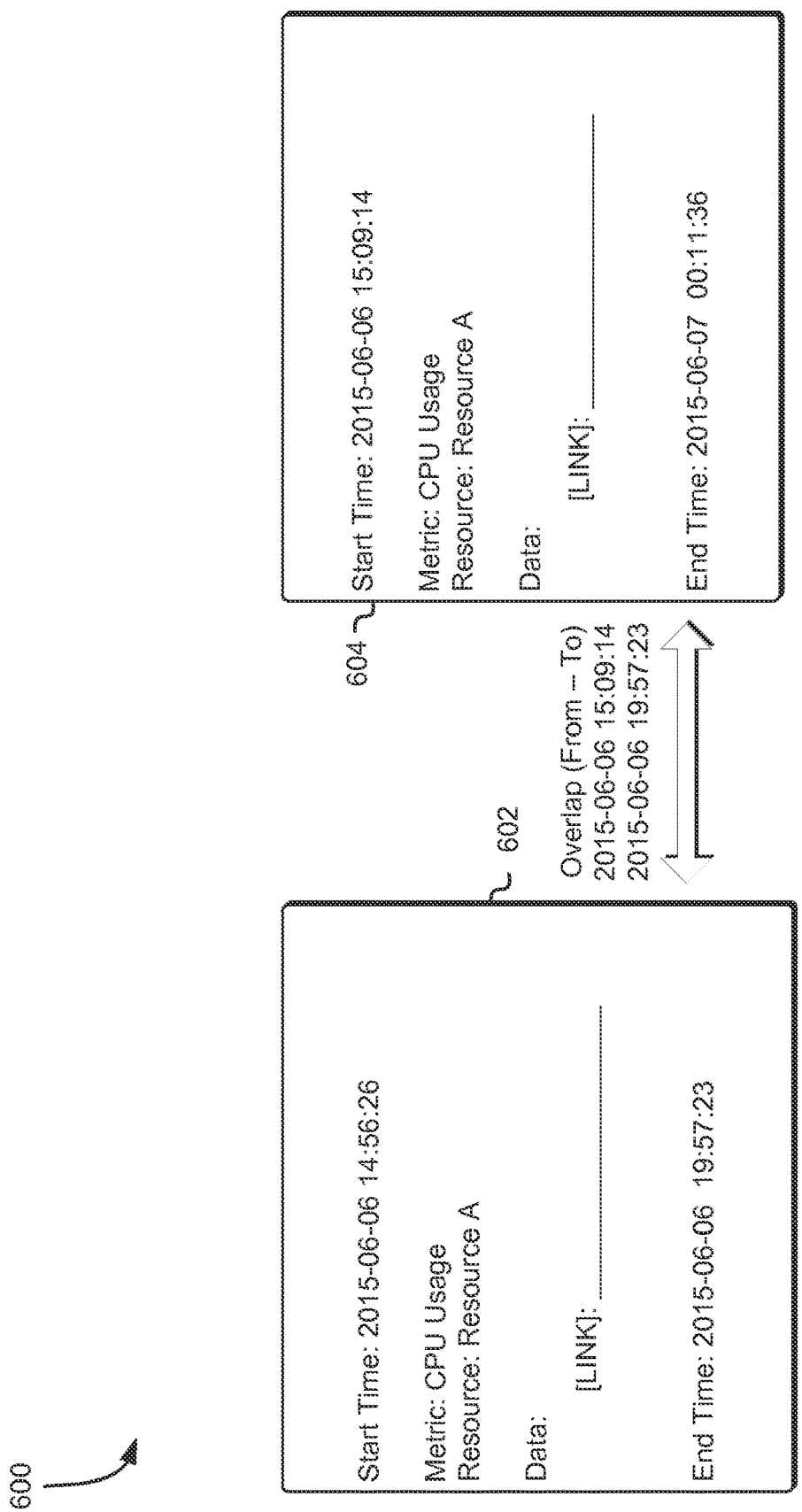
FIG. 6 shows an illustrative example of an environment in which the metadata included within temporal records are analyzed to determine any overlapping temporal regions for creation of updated temporal records in accordance with at least one embodiment.

As noted above, an analytics service may evaluate the temporal data region of a temporal data record received from a customer of the computing resource service to identify a start time for the record that may be used to generate a database query. Further, the analytics service may evaluate the temporal data region of a temporal data record received in response to its query to determine whether there is any overlap between the temporal data region of the temporal data record from the customer and the temporal data record obtained from the database. The temporal data region for each of these temporal data records may be included within these temporal data records in the form of metadata. Accordingly, FIG. 6 shows an illustrative example of an environment 600 in which the metadata included within temporal records 602, 604 are analyzed to determine any overlapping temporal regions for creation of updated temporal records in accordance with at least one embodiment.

In the environment 600, an analytics service may evaluate a first temporal data record 602 received from a customer of the computing resource service provider that may incorporate data that is to be added and referenced in a database. The first temporal data record 602 may specify, in the form of metadata or through explicit expression in the record, a temporal data region defined by a start time (e.g., 2015-06-06 14:56:26, as illustrated in FIG. 6) and an end time (e.g., 2015-06-06 19:57:23). In addition to the temporal data region, the first temporal data record 602 may define the associated computing resource and the metric for which data was collected. This information may be used to identify other temporal data records that may be associated with data for the same computing resource metric. In addition to the aforementioned information, the first temporal record 602 may include a link to the location where the corresponding data for the temporal data region is stored. For instance, the link may be an HTML link to a location within the analytics server database where the data may be stored. Alternatively, the link may be directed towards a remote (e.g., relative to the analytics server) storage location where the data may be stored.

The analytics service may obtain a second temporal data record 604 from the database that has an end time that is greater than the start time specified in the first temporal data record 602. For instance, as illustrated in FIG. 6, the second temporal data record 604 specifies an end time (e.g., 2015-06-07 00:11:36) that is greater than the start time specified in the first temporal data record 602 (e.g., 2015-06-06 14:56:26). The second temporal data record 604 may be similar to the first temporal data record 602 in that it may specify the temporal data region for the data, the associated computing resource and metric, and a link to where the corresponding data is stored.

The analytics service may evaluate the temporal data regions of the temporal data records 602, 604 to determine whether there is any overlap in these temporal data regions. For instance, as illustrated in FIG. 6, the analytics service has identified a temporal data region overlap between 2015-06-06 15:09:14 and 2015-06-06 19:57:23. Since the bounds of this overlap do not correspond to the start time and end time of a single temporal data region of one of the temporal data records, the analytics service may generate a new updated temporal data record for this overlapping temporal data region that incorporates the metadata from both the first temporal data record 602 and the second temporal data record 604. For the other smaller, non-overlapping temporal data regions, the analytics service may generate updated temporal data records that include the metadata of either the first temporal data record 602 (e.g., temporal data region from 2015-06-06 14:56:26 to 2015-06-06 15:09:14) or the second temporal data record 604 (e.g., temporal data region from 2015-06-06 19:57:23 to 2015-06-07 00:11:36). The analytics service may store these updated temporal data records within the database while deleting the temporal data records 602, 604.

Figure 7:
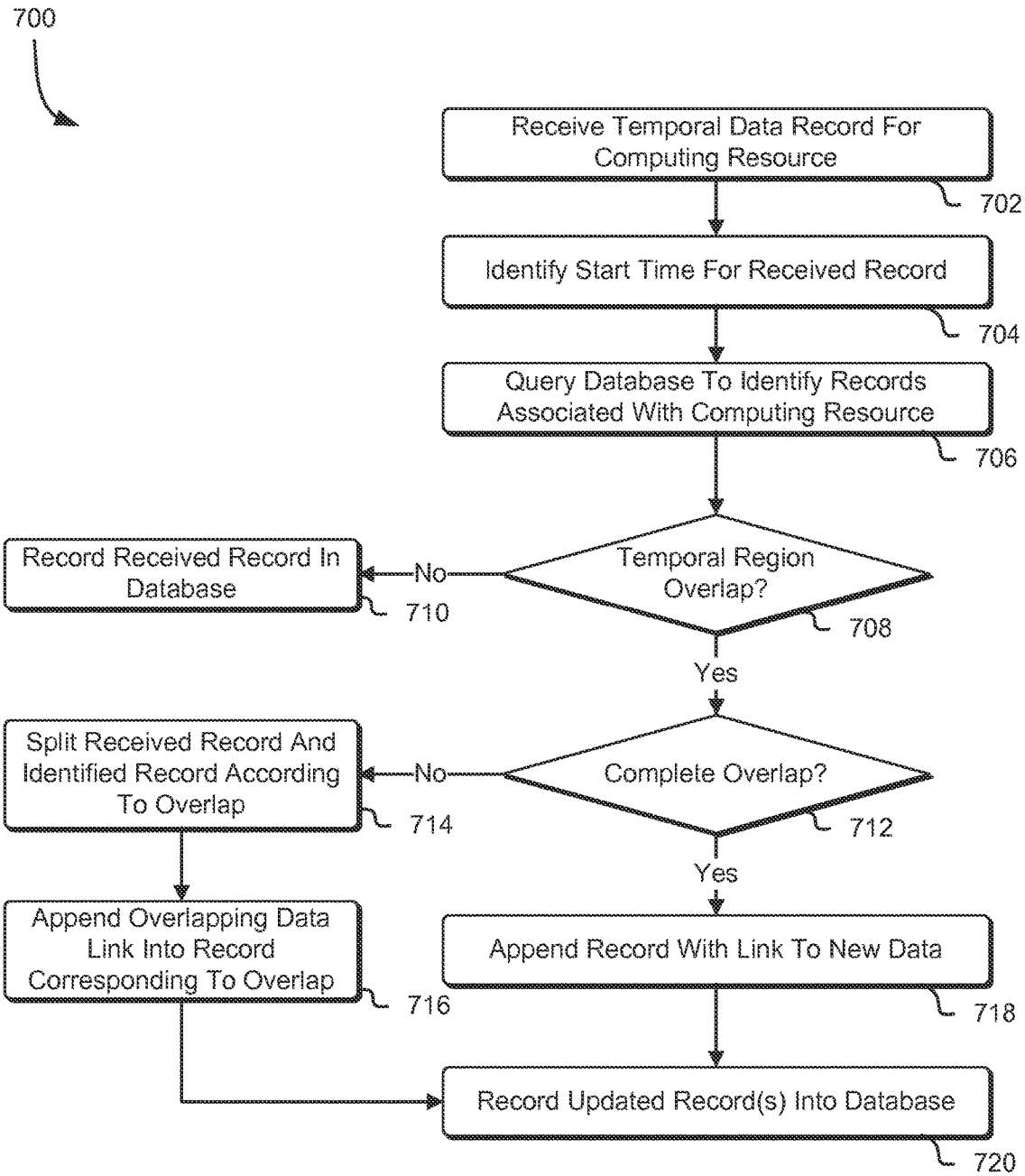
FIG. 7 shows an illustrative example of a process for encoding temporal data records such that there are no overlapping temporal regions in response to a read request in accordance with at least one embodiment.

As noted above, an analytics service may process one or more temporal data records from customers of the computing resource service provider by identifying any temporal data records having an end time greater than the start time of the one or more temporal data records and generating new temporal data records if there are temporal data regions that produce an overlap. These new temporal data records may correspond to non-overlapping and distinct temporal data regions such that queries for temporal data records having an end time greater than a specified start time can be completed through one database read operation. Accordingly, FIG. 7 shows an illustrative example of a process 700 for encoding temporal data records such that there are no overlapping temporal regions in response to a read request in accordance with at least one embodiment. The process 700 may be performed by the aforementioned analytics service, which may be configured to process temporal data records and generate new temporal data records as needed and based at least in part on the specified temporal data regions of the temporal data records.

At any time, the analytics service may receive 702 a temporal data record for a particular computing resource. The temporal data record may be provided to the analytics service by a customer user of the computing resource service provider that may interact with an interface of the analytics service to upload one or more temporal data records for its computing resources maintained by the computing resource service provider. Alternatively, the temporal data record may be provided by one or more other services of the computing resource service provider through one or more analytics servers of the analytics service. For instance, a computing resource may include a reporting agent configured to generate temporal data records as data is generated for one or more metrics of the computing resource. The one or more other services may obtain the data and associated temporal data record from the reporting agent and provide the data and the temporal data record to the analytics service for processing.

In response to the receipt of a temporal data record from a customer of the computing resource service provider (e.g., user or other service), the analytics service may evaluate the received temporal data record to identify 704 a start time of the temporal data region of the temporal data record. As noted above, a temporal data record may include metadata that may specify a start time and an end time for a temporal data region of the data associated with the record. The analytics service may determine, based at least in part on this metadata, the start time of this temporal data region.

The analytics service may utilize this identified start time of the temporal data region to query 706 a database to identify any records associated with the computing resource and the corresponding metric that have an end time that is greater than the identified start time. For instance, the analytics service may generate a database query that includes the identified start time, an identifier corresponding to the target computing resource, and the metric for this target computing resource. The analytics service may transmit this query to one or more analytics servers that are configured to process the query by evaluating a database index to identify if any temporal data records stored within the database would satisfy the query. If so, the one or more analytics servers may provide to the analytics service a temporal database record that satisfies the query. The analytics service may evaluate the temporal database record obtained from the database through the analytics servers to identify the temporal data region of this record.

In an embodiment, in response to the query, the analytics service will identify a plurality of records associated with the computing resource and the corresponding metric that have an end time that is greater than the identified start time. The analytics service may sort these identified records based at least in part on their respective end times such that the analytics service may select an identified record having a specified end time that is closest to the start time of the temporal data region. Thus, the analytics service may utilize this selected record from the sorting of the identified bi-temporal data records to perform further evaluations to determine any temporal data region overlaps with the received bi-temporal data record.

Based at least in part on the evaluation of the temporal data region of the record obtained from the database and the temporal data region of the temporal data record obtained from the customer or other service, the analytics service may determine 708 whether there is an overlap between the temporal data regions. If the analytics service determines that there is no temporal data region overlap between the temporal data records, the analytics service may record 710 the received temporal data record from the customer or other service in the database. Further, the analytics service may update the database index to indicate the presence of this new temporal database record within the database. This may enable the analytics service to process any queries specifying an end time greater than the start time of the received temporal data record.

If there is an overlap between the temporal data regions of the temporal data records, the analytics service may determine 712 whether there is a complete overlap (e.g., start times and end times are the same) between these temporal data records. If there is a complete overlap between these temporal data records, the analytics service may append 718 the temporal data record from the database to include the metadata and link from the received temporal data record obtained from the customer or other service. Thus, the temporal data record from the database may now include references to additional data within this temporal data region. The analytics service may record 720 this updated temporal data record in the database.

If there isn't a complete overlap between the temporal data regions, the analytics service may split 714 the received temporal data record and the identified temporal data record from the database according to the overlapping temporal data regions. For instance, the analytics service may determine the start time and the end time of each of the temporal regions and determine the non-overlapping time ranges that may be used for the new updated temporal data records. Further, the analytics service may identify the temporal data range that corresponds to the data associated with both temporal data records. The analytics service may append 716 the resulting temporal data record corresponding to the overlap with the metadata and links of both original temporal data records. Further, the analytics service may generate new temporal data records for the smaller temporal data regions for which only one source of data is associated with the corresponding smaller temporal data region. The analytics service may record 720 these newly created temporal data records within the database.

In an embodiment, the analytics service will await confirmation that the newly created temporal data records have been successfully stored within the database. In response to the receipt of the confirmation that the temporal data records have been stored in the database, the analytics service may submit one or more API calls to the one or more analytics servers to delete the now redundant temporal data records from the database. Additionally, in response to the one or more API calls, the one or more analytics servers may update the database index to remove any entries corresponding to the deleted temporal data records.

Figure 8:
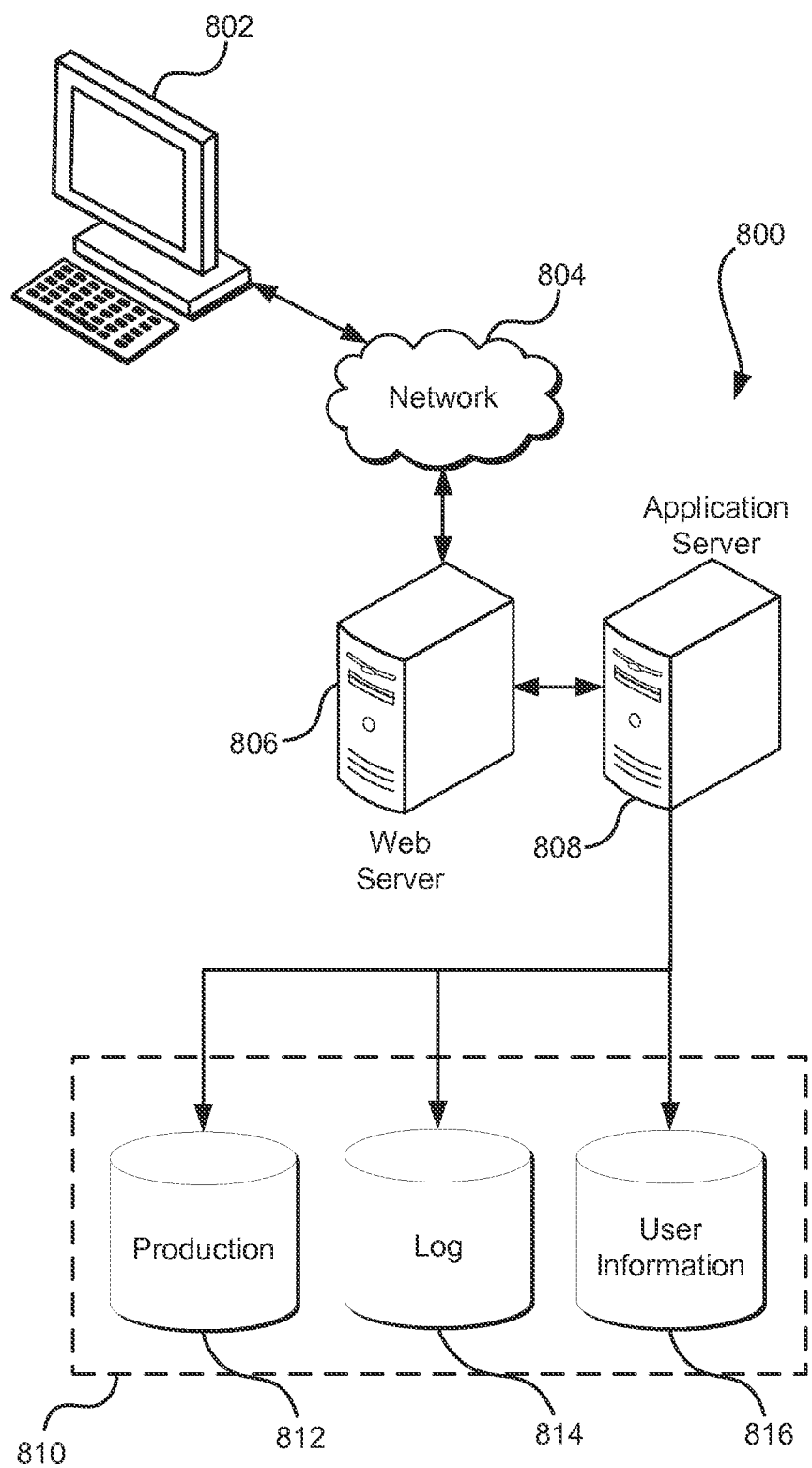
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory including instructions that, when executed by the one or more processors, cause the system to at least:
   receive a first temporal data record corresponding to a computing resource metric, the first temporal data record specifying a first temporal data region defined by a first start time and a first end time;
   generate a database query configured such that a second temporal data record specifying a second temporal region defined by a second start time and a second end time, the second end time greater than the first start time is responsive to the database query;
   submit the database query to obtain the second temporal data record;
   if the second temporal data region of the second temporal data record overlaps the first temporal data region of the first temporal data record as determined by the second start time being less than the first end time:
   generate one or more new temporal data records such that the new temporal data records correspond to non-overlapping temporal data regions;
   record the one or more new temporal data records in the database; and
   delete the first temporal data record and the second temporal data record; and
   if the second temporal data region of the second temporal data record does not overlap the temporal data region of the first temporal data record as determined by the second start time being less than the first end time, record the first temporal data record in the database.

2. The system of claim 1, wherein the instructions further cause the system to append the second temporal data to include metadata of the first temporal data if the second temporal data region is the same as the first temporal data region.

3. The system of claim 1, wherein the first temporal data record is provided by a reporting agent of a computing resource of a computing resource service, the computing resource comprising generated data corresponding to the computing resource metric.

4. The system of claim 1, wherein the instructions further cause the system to update an index of the database to indicate that the one or more new temporal data records have been recorded in the database.

5. A computer-implemented method, comprising:
- receiving a first temporal data record specifying a start time and an end time at which data associated with the first temporal data record was collected;
- identifying a second temporal data record specifying a start time and an end time at which data associated with the second temporal data record was collected, wherein the end time of the second temporal data record is greater than the start time of the first temporal data record;
- determining whether there is a temporal overlap between the first temporal data record and the second temporal data record at least in part by determining whether the start time of the second data record is less than the end time of the first temporal data record; and
- generating one or more temporal data records based at least in part on the temporal overlap such that the one or more temporal data records correspond to non-overlapping time intervals.

6. The computer-implemented method of claim 5, wherein the second temporal data record is identified based at least in part on a response to a database query configured such that a temporal data record specifying an end time greater than the start time of the first temporal data record is responsive to the database query.

7. The computer-implemented method of claim 5, further comprising deleting the first temporal data record and the second temporal data record as a result of generation of the one or more temporal data records.

8. The computer-implemented method of claim 5, further comprising:
- identifying a plurality of temporal data records specifying an end time that is greater than the start time of the first temporal data record; and
- sorting the plurality of temporal data records based at least in part on a proximity between the end time of individual temporal data records of the plurality of temporal data records and the start time of the first temporal data record such that the second temporal data record is identified as a result of the second temporal data record including a proximity that is lesser than proximities for other temporal data records of the plurality of temporal data records.

9. The computer-implemented method of claim 5, further comprising:
- storing the one or more temporal data records in a database comprising a plurality of temporal data records; and
- updating an index of the database to indicate a presence of the one or more temporal data records in the database.

10. The computer-implemented method of claim 5, wherein the first temporal data record is received from a computing resource service comprising one or more computing resources, the first temporal record associated with a computing resource metric of at least one computing resource of the one or more computing resources.

11. The computer-implemented method of claim 5, wherein the first temporal record is received from a customer computer system of a computing resource service provider, the customer computer system configured to provide the first temporal record through an interface provided by the computing resource service provider.

12. The computer-implemented method of claim 5, further comprising:
- receiving a third temporal data record specifying a start time and an end time at which data associated with the third temporal data record was collected;
- identifying a fourth temporal data record specifying an end time that is greater than the start time of the first temporal data record;
- determining whether there is a temporal overlap between the third temporal data record and the fourth temporal data record; and
- recording the third temporal data record within a database as a result of there being no temporal overlap between the third temporal data record and the fourth temporal data record.

13. A non-transitory computer-readable storage medium comprising executable instructions that, when executed by one or more processors of a computer system, cause the computer system to at least:
- obtain a first temporal data record specifying a time interval during which data for a computing resource metric was collected;
- obtain a second temporal data record specifying an end time that is greater than a start time of the time interval;
- determine whether there is an overlap between the time interval of the first temporal data record and a time interval that is defined by a start time of the second temporal data record and the end time, wherein there is an overlap if the start time of the second temporal data record is less than the end time of the first temporal data record; and
- as a result of the overlap, generate new temporal data records that correspond to non-overlapping time intervals.

14. The non-transitory computer-readable storage medium of claim 13, wherein the instructions further cause the computer system to:
- obtain a third temporal data record specifying a time interval during which data for another computing resource metric was collected;
- obtain a fourth temporal data record specifying an end time that is greater than a start time of the time interval of the third temporal data record;
- determine that there is no overlap between the time interval of the third temporal data record and a time interval of the fourth temporal record; and
- record the third temporal data record in a database.

15. The non-transitory computer-readable storage medium of claim 13, wherein the instructions further cause the computer system to transmit a request to one or more servers to store the new temporal data records in a database comprising a plurality of temporal data records.

16. The non-transitory computer-readable storage medium of claim 15, wherein the instructions further cause the computer system to:
- receive confirmation from the one or more servers that the new temporal data records are stored within the database;
- delete the first temporal record; and
- transmit a request to the one or more servers to delete the second temporal record from the database such that the second temporal record is deleted from the database and an index of the database is updated to remove any entries associated with the second temporal record.

17. The non-transitory computer-readable storage medium of claim 15, wherein the instructions further cause the computer system to update an index of the database to indicate that the new temporal data records are stored in the database, the index usable to identify a location in the database where the new temporal data records are stored in response to database queries.

18. The non-transitory computer-readable storage medium of claim 13, wherein the first temporal record is obtained from a reporting agent of a computing resource of a computing resource service provider.

19. The non-transitory computer-readable storage medium of claim 13, wherein the instructions further cause the computer system to generate a database query configured such that a temporal data record specifying an end time greater than the start time is responsive to the database query to obtain the second temporal data record.

20. The non-transitory computer-readable storage medium of claim 13, wherein the instructions further cause the computer system to append the second temporal data record to include metadata of the first temporal data record as a result of the overlap between the first temporal data record and the second temporal data record including the time interval of the second temporal data record.

\* \* \* \* \*